United States Patent
Kirkham

[11] Patent Number: 5,620,208
[45] Date of Patent: Apr. 15, 1997

[54] BOLTLESS FLANGE

[75] Inventor: Robert J. Kirkham, Blackfoot, Id.

[73] Assignee: Lockheed Idaho Technologies Company, Idaho Falls, Id.

[21] Appl. No.: 446,186

[22] Filed: May 19, 1995

[51] Int. Cl.$^6$ .................................... F16L 13/11
[52] U.S. Cl. .................... 285/21.1; 285/284; 285/920; 285/290; 285/363; 27/17; 228/191
[58] Field of Search .............................. 285/21, 22, 363, 285/284, 920, 290; 27/17; 228/191, 264; 220/359; 269/7

[56] References Cited

U.S. PATENT DOCUMENTS

| | | | |
|---|---|---|---|
| 1,369,919 | 3/1921 | Ellel | 285/21 |
| 1,371,720 | 3/1921 | Baer | 27/17 |
| 1,818,485 | 8/1931 | Lambert | 27/17 |
| 1,863,855 | 6/1932 | Jenkins | 285/21 |
| 2,061,461 | 11/1936 | Gouhin | 27/17 |
| 2,479,755 | 8/1949 | Martin | 285/287 |
| 2,961,363 | 11/1960 | Lowes | 285/21 |
| 3,095,112 | 6/1963 | Weinstein et al. | 285/22 |
| 3,353,849 | 11/1967 | Laurizio | 285/21 |
| 4,436,158 | 3/1984 | Carstensten | 175/325.5 |
| 4,718,698 | 1/1988 | Hill | 285/21 |
| 5,156,420 | 10/1992 | Bokor et al. | 285/71 |

FOREIGN PATENT DOCUMENTS 587713  5/1947  United Kingdom ................ 285/21

*Primary Examiner*—Eric K. Nicholson
*Attorney, Agent, or Firm*—Hopkins Roden Crockett Hansen & Hoopes

[57] ABSTRACT

A boltless, reusable flange system for joining metal piping includes a circular, wedge-shaped tongue on an upper flange for mating with a groove containing a fusible alloy in a lower flange. The lower flange includes a heating element for melting the fusible alloy, and a thermocouple device to sense the alloy temperature. Heat can be controlled and supplied from a remote source and monitored by a remote temperature indicator. The upper flange is positioned above the lower flange, tongue and groove aligned, and the lower flange is heated until the fusible alloy melts to allow the upper tongue to settle down within the lower groove. Upon removal of the heat, the alloy hardens to further bring the two flanges together in a solid and sealed couple, compressing an optional gasket.

17 Claims, 2 Drawing Sheets

BOLTLESS FLANGE

CONTRACTUAL ORIGIN OF THE INVENTION

The United States Government has rights in this invention disclosed under contract number DE-AC07-84ID12435 between the U.S. Department of Energy and Westinghouse Idaho Nuclear Company, now contract number DE-AC07-94ID13223 with Lockheed Idaho Technologies Company.

TECHNICAL FIELD

This invention relates generally to pipe joints or couplings and, more specifically, to a boltless, remotely operable, reusable, pipe flange system.

BACKGROUND OF THE INVENTION

Flanges are commonly used in pipe (tubing) to provide additional strength and supporting area, and also to provide an enhanced means for joining together separate sections of pipe. The pipe may be deformed to form a flange as part of the pipe or, alternately, separately manufactured flanges may be joined to pipe sections by welding, threading, brazing, gluing, or other means, depending on desired configurations and the type of pipe and flanges being used.

In the case where flanges are used for joining pipe sections together, mating flanges on the ends of the pipes (where a joint is to be formed) are typically assembled together to join the pipe sections by aligning bolt holes in each flange and bolting the flanges together. It is not uncommon to use anywhere from two to twenty-four bolts for joining flanges used with industrial piping having dimensions of between ½" and 24" diameter. A common problem in using bolted flange pipe connections is the potential for stripping bolt or nut threads which causes excessive repair and assembly time. In certain cases, the pipe flanges are seal welded around the perimeter of the joint prior to bolting in order to create leakproof joints. Thus, it is clear that the flange assembly process is often cumbersome and time consuming.

These noted drawbacks of conventional, bolted flanges are especially undesirable when a flanged joint is located in a hazardous area, such as extreme temperature ranges or weather conditions, under water, radiation areas, and toxic gas or material environments. Obviously, such common flange assembly problems can be detrimental to the flange worker in these hazardous areas.

One solution to some of these flange assembly problems is disclosed in U.S. Pat. No. 4,718,698, issued to Hill. Hill discloses an apparatus and method of forming a fusion welded butt joint between thermoplastic pipe sections. The apparatus comprises a pair of insert sleeves made of a thermoplastic material (e.g., polyethylene) which melts and fuses with thermoplastic pipe sections. The apparatus also includes a coupling collar, formed of polyethylene, that surrounds the pipe section joint and sleeves. Imbedded in the coupling collar is a heater coil that raises the temperature of the thermoplastic material to its melting point to fuse the adjacent surface of the coupling collar, pipe sections, and sleeves, to form a homogenous welded joint.

One disadvantage of the Hill patent coupling connection is that it is only useable with thermoplastic pipe and not metal pipe. Another disadvantage is that separate sleeve inserts of similar thermoplastic material must be used to form the homogeneous bonded connection. Furthermore, and most importantly, the coupling connection is not reusable.

Accordingly, objects of the present invention are to overcome the aforementioned prior art problems by providing a remotely operable, reusable, easy-to-use, flange system for pipes.

SUMMARY OF THE INVENTION

According to principles of the present invention in a preferred embodiment, a boltless, reusable, easy-to-use flange system for joining metal piping includes a circular, wedge-shaped tongue on an upper flange for mating with a groove containing a fusible alloy in a lower flange. The lower flange includes a heating element for melting the fusible alloy, and a thermocouple device to sense the alloy temperature.

Advantageously, heat can be controlled and supplied from a remote source and monitored by a remote temperature indicator. The upper flange is positioned above the lower flange, tongue and groove aligned, and the lower flange is heated until the fusible alloy melts to allow the upper tongue to settle down within the lower groove. Upon removal of the heat, the alloy hardens to further bring the two flanges together, compressing an optional gasket.

This flange system is also reusable. Namely, the fusible alloy can be reheated and the flanges disassembled, and then reassembled and reheated to reseal and reuse the flange joint numerous times. Furthermore, the remote operability and ease-of-use significantly reduces worker time spent in hazardous areas for assembly or disassembly of pipe.

Other objects, advantages, and capabilities of the present invention will become more apparent as the description proceeds.

DETAILED DESCRIPTION OF THE PREFERRED EMBODIMENT

Figure 1:
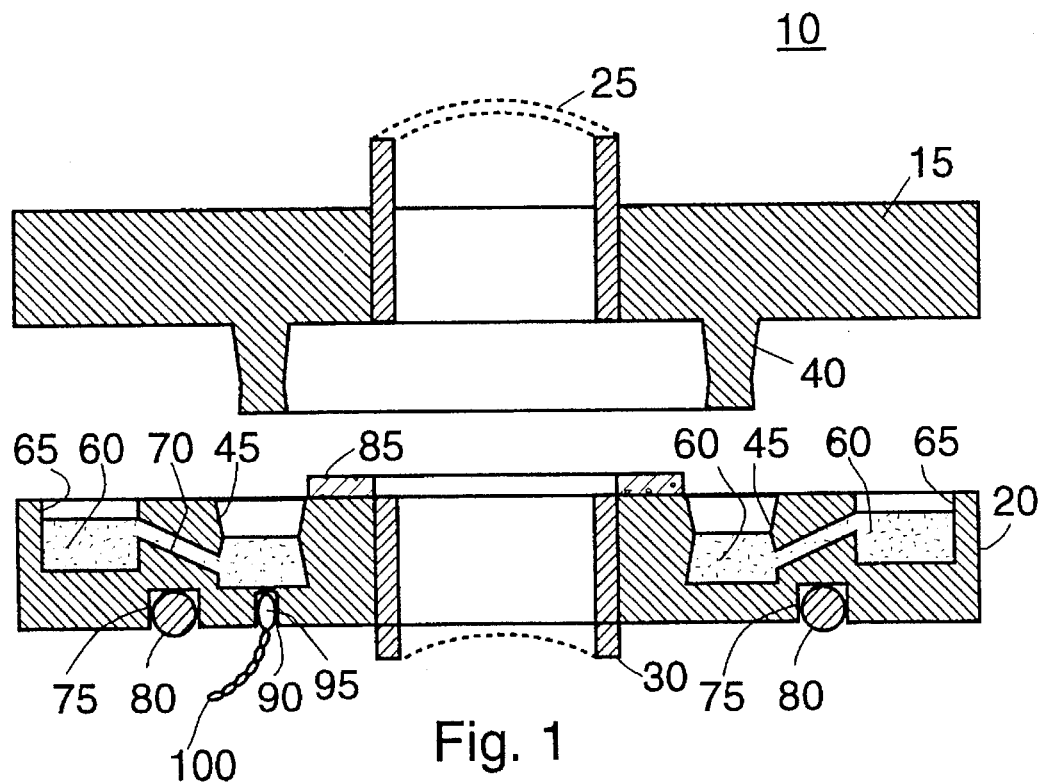
FIG. 1 is a side-section, exploded view of the upper and lower flanges of the present invention flange system.

FIG. 1 is a side-section, exploded view of the present invention flange system 10 having upper flange 15 and lower flange 20 for joining sections of pipe 25 and 30. This expanded (disengaged) view represents the unassembled condition of flanges 15 and 20. In the preferred embodiment, flanges 15 and 20 are circular in shape although other shapes could similarly be used while still employing the present inventive principles.

Figure 2:
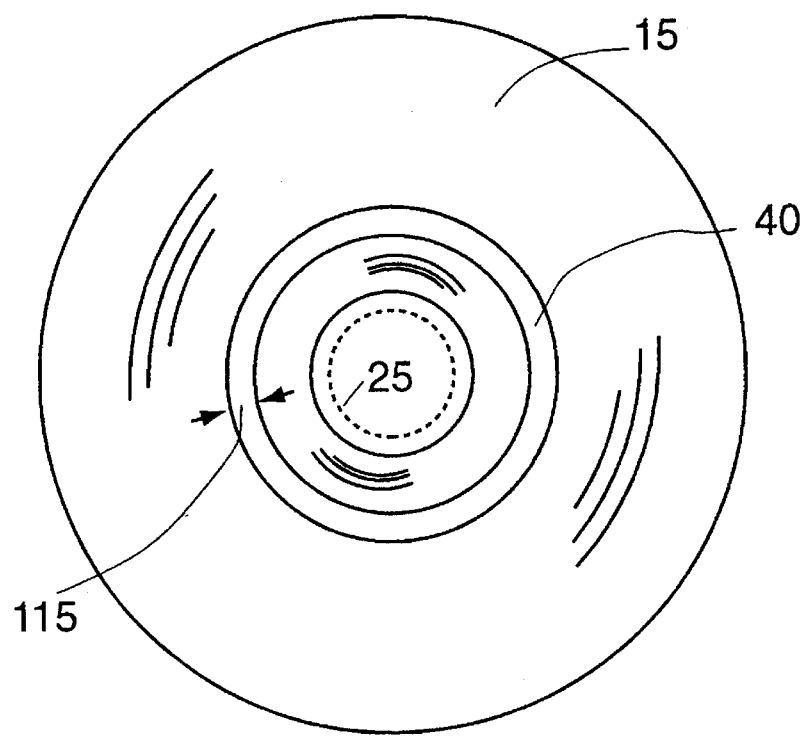
FIG. 2 is a bottom view of the upper flange of the present invention.

Upper flange 15 includes, most importantly, tongue 40 for matably engaging with groove 45 of lower flange 20. As shown more clearly in FIG. 2, tongue 40 is circular in form, reflecting the preferred circular nature of the flange itself. The tongue and groove are circular and concentric around the opening in each of the upper and lower flanges, wherein the opening is adapted for receiving pipe 25 and 30 respectively.

Figure 3:
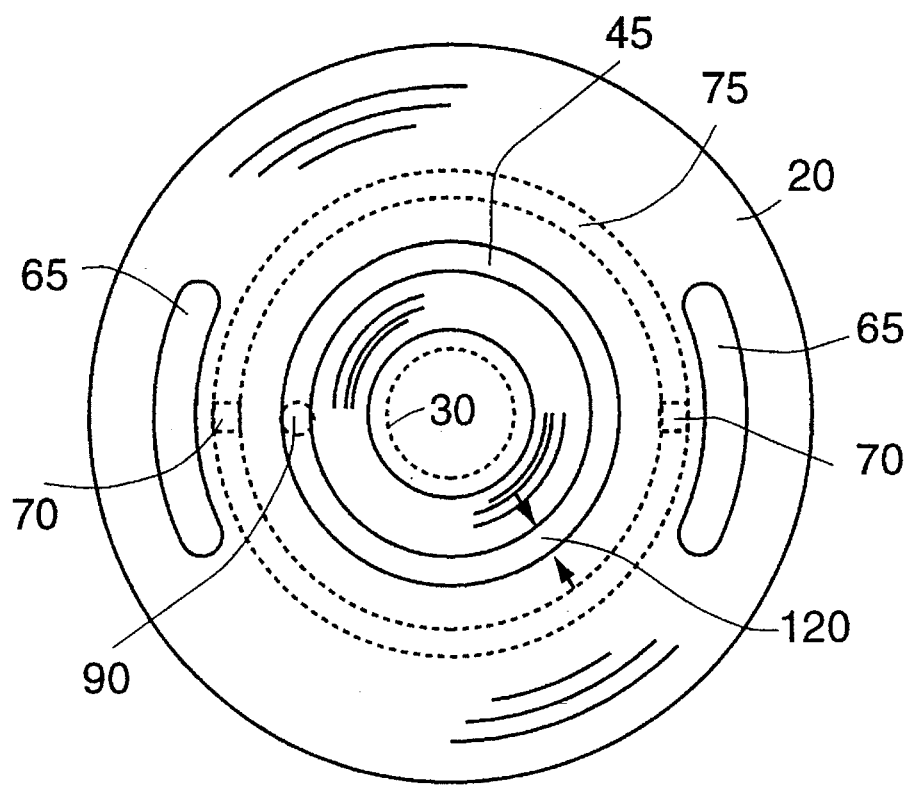
FIG. 3 is a top view of the lower flange.

In reference to FIGS. 1 and 3, lower flange 20 includes circular groove 45 for mating with tongue 40 of upper flange 15. Groove 45 is filled with a fusible alloy 60 from adjacent alloy reservoir 65 via alloy conduit 70. Circular heater groove 75 holds heater conduit 80 in the bottom of lower flange 15. Heater conduit 80 is any conventional steam tube, electric wire heating element, or the like, used for heating fusible alloy 60. An optional gasket 85 may be located concentric with groove 45 and pipe 30. Thermocouple aperture 90 holds sensing element 95 below groove 45 for monitoring the temperature of fusible alloy 60. Thermocouple sensing element 95 is connected to thermocouple cable 100. Although a preferred embodiment of lower flange 20 includes thermocouple sensing element 95 and cable 100, it is understood that these are optional features if the melting point of fusible alloy 60 is known, and if an appropriately controlled and known amount of heat is applied through heater conduit 80 to properly melt the alloy.

Figure 4:
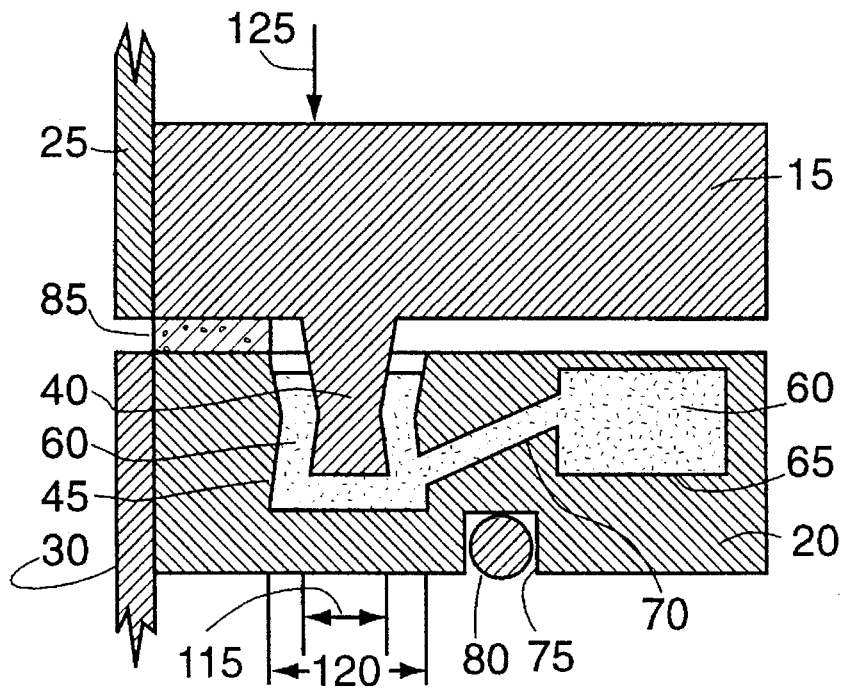
FIG. 4 is an enlarged, partial side-section view of the assembled flanges.

Operation of flange system 10 is best described in reference to FIGS. 1 and 4. First, lower flange 20 and attached pipe 30 are vertically supported by appropriate means, and upper flange 15 and its attached pipe 25 are positioned above the lower flange such that tongue 40 rests on alloy 60 within groove 45. Heat is then applied to lower flange 15 via heater conduit 80 until alloy 60 melts, as sensed by thermocouple 95. This heating allows tongue 40 of upper flange 15 to drop into lower flange groove 45. The melted alloy 60 is displaced by tongue 40 and raises the alloy level in groove 45 and in reservoir 65 via alloy conduit 70. Obviously, flange system 10 is only used in the vertical configuration as shown so that when fusible alloy 60 is melted within groove 45, the alloy remains contained with the groove.

In the preferred embodiment, to provide a proper mating of the flanges using the tongue and groove coupling effect in connection with fusible allow 60, tongue 40 and groove 45 are each substantially wedge shaped (in cross-section) to increase interlocking sheer tension with fusible alloy 60. FIGS. 1 and 4 depict tongue 40 and groove 45 each as a double wedge shape although other wedge configurations are similarly usable. In this context, the widest dimension 115 of tongue 40 (FIGS. 4 and 2) must be less than the narrowest neck-down dimension 120 of alloy groove 45 (FIGS. 4 and 3). Furthermore, by using a "shrinking" type fusible alloy 60, the alloy will pull upper flange 15 down toward lower flange 20 in direction of arrow 125 upon cooling (after the heat is turned off). The cooling of fusible alloy 60 around tongue 40 in groove 45 forms a solidly coupled seal between flanges 15 and 20. In this context, it should be noted that gasket 85 is simply optional, although helpful, to protect alloy 60 from any damaging materials that may leak from within pipes 25 and 30.

Optionally, fusible alloy 60 is protected from damage by the use of a protective cover film of an appropriate wax or meltable polymer that is chemically resistive to corrosive attack. The polymer may be used alone or in conjunction with the gasket by being positioned over alloy 60 in groove 45.

Removal or disconnection of the flanges is accomplished by reestablishing the heat source via heater conduit 80 and applying heat until alloy 60 remelts and the flanges are able to be separated. Reuse or reconnection of the flanges is also possible, since repeated melting does not cause degradation or loss of elemental constituents in the fusible alloy.

A distinct advantage of flange system 10 is that after initial positioning of the flanges with respect to each other for assembly purposes, the actual interlocking or unlocking of the flanges may be accomplished remotely from the flange and piping area. This allows a worker to avoid prolonged exposure to any hostile environments in which the flange is used. Specifically, heater conduit 80 and thermocouple cable 100 may be of any length, and routed to any area, to provide for remote control of the system. Other definite advantages are that the fusible alloy provides for a reusable flange system, the fusible alloy provides a substantially "perfect" seal in connection with mating tongue 40 and groove 45, and the alloy further provides a solid coupling between the flanges.

The term "fusible alloy" refers to any of the more than 100 white metal alloys that melt at relatively low temperatures. Most commercial fusible alloys contain bismuth, lead, tin, cadmium, indium, and antimony, and special alloys of this class may also contain significant amounts of zinc, silver, thallium, or gallium.

Many of the fusible alloys used in industrial applications are based on eutectic compositions of multiple metals (see Table 1). An eutectic alloy is one that has the lowest melting point of an alloy of two or more components. It is obtainable by varying the percentage of the components. Eutectic alloys are the particular alloys that have definite and minimum melting points compared with other combinations of the same metals. Use of such alloys is important in automatic safety devices such as fire sprinklers, boiler plugs, and controls for furnaces. Under ambient temperature, such an alloy has sufficient strength to hold parts together, but at a specific elevated temperature, the fusible-alloy link or connection will melt, thus disconnecting the parts.

In addition to eutectic alloys, each of which melts at a specific temperature, there are numerous non-eutectic alloys, which melt over a range of temperatures. Some of these non-eutectic alloy compositions are listed in the bottom section of Table 1.

TABLE 1

METALS AND THEIR FUSIBLE ALLOYS

| Alloy or Metal | | Melt Range °C. | % Composition | | | | |
|---|---|---|---|---|---|---|---|
| | | | Bi | Pb | Sn | Cd | Sb |
| Bismuth | Bi | 271 | 100% | | | | |
| Lead | Pb | 327 | | 100% | | | |
| Tin | Sn | 232 | | | 100% | | |
| Cadmium | Cd | 321 | | | | 100% | |
| Antimony | Sb | 631 | | | | | 100% |
| Alloys* | "A" | 47 | 44.7 | 22.6 | 8.3 | 5.3 | 19.1 |
| (Eutectic) | G | 124 | 55.5 | 44.5 | | | |
| | H | 139 | 58.0 | | 42.0 | | |

TABLE 1-continued

METALS AND THEIR FUSIBLE ALLOYS

| Alloy or Metal | | Melt Range °C. | % Composition | | | | |
|---|---|---|---|---|---|---|---|
| | | | Bi | Pb | Sn | Cd | Sb |
| Alloys* (non-eutectic) | P | 247 | 87.0 | 87.0 | | | 13.0 |
| | T | 70–90 | 42.5 | 37.7 | 11.3 | 8.5 | |
| | Y | 103–227 | 48.0 | 28.5 | 14.5 | | 9.0 |
| | Z | 138–170 | 40.0 | | 60.0 | | |

*excerpts from the Tin Research Institute.

A review of Table 1 metal and alloy melting temperatures indicates that selection of a particular composition can result in a significantly lower melting point for both eutectic and noneutective alloys, when compared to any of the base metals.

Most of these alloys are heavy, bright, silvery, nontarnishing metals that can be melted repeatedly with negligible loss of elemental constituents. They are aging alloys and thus their mechanical properties often are dependent on the period of time that has elapsed since casting, as well as on conditions of casting and rate of solidification.

In certain alloys, normal thermal contraction due to cooling after solidification can be partly, completely, or more than compensated for by expansion due to aging. For example, bismuth alloys containing 33% to 66% lead exhibit net expansion after solidification and during subsequent aging. Some fusible alloys show no contraction (shrinkage) and expand rapidly while still warm. Others show slight shrinkage during the first few minutes after solidification and then begin to expand. In others, expansion does not commence until some time after the fusible alloy casting has cooled to room temperature. All three characteristics—net expansion, net contraction, and little or no volume change—provide specific advantages, depending on the application.

In the present invention, an alloy is selected based on having a contraction characteristic which would tend to draw upper flange 15 down in compression with lower flange 20, assuming that the mating surfaces, tongue 40 and groove 45, are specifically designed for this contraction such as in the depicted wedge shape. The flanges are fabricated from any conventional metal, and the fusible alloy is selected based on the application. A typical alloy for this flange system can be the bismuth-lead alloy (alloy G) or a bismuth, lead, tin, and antimony alloy, such as alloy Y of Table 1. These alloys offer structural strength to the joint. A typical corrosion resistant polymer can be a high density polyethylene having a melting point of about 135° C.

What has been described above are the preferred embodiments for a boltless, easy-to-use, reusable, remotely operable flange system. It will be obvious that the present invention is easily implemented utilizing any of a variety of conventional or modified components existing in the art. Accordingly, while the present invention has been described by reference to specific embodiments, it will be obvious that other alternative embodiments and methods of implementation or modification may be employed without departing from the true spirit and scope of the invention.

I claim:

1. A pipe flange system comprising:
   (a) a lower flange having a groove and alloy reservoir therein, the alloy reservoir communicating with the groove for supplying a fusible alloy and for allowing displacement of the alloy upon mating of the tongue and groove;
   (b) heating means attached to the lower flange; and,
   (c) an upper flange having a tongue protruding therefrom for mating with the groove of the lower flange, whereby upon heating of the fusible alloy by the heating means the tongue mates with the groove, and whereby upon cooling of the fusible alloy the flanges solidly couple and seal.

2. The flange system as recited in claim 1 wherein the tongue and groove are formed in a wedge-shaped cross-section.

3. The flange system as recited in claim 1 wherein the tongue and groove are formed around an opening in each of the upper and lower flanges respectively, each opening adapted for receiving a pipe.

4. The flange system as recited in claim 1 wherein the fusible alloy includes elements selected from the group consisting of bismuth, lead, tin, cadmium, and antimony.

5. The flange system as recited in claim 1 wherein the fusible alloy melts within the temperature range of 47° C. to 247° C.

6. The flange system as recited in claim 1 wherein the heating means is selected from the group consisting of an electrical wire heating element and a steam tube.

7. The flange system as recited in claim 1 further including temperature sensing means in the lower flange.

8. The flange system as recited in claim 1 further including a gasket between the upper and lower flanges surrounding an opening in each of the upper and lower flanges, the opening adapted for receiving a pipe.

9. The flange system as recited in claim 1 wherein the lower flange further includes a meltable polymer for providing corrosion resistance to the fusible alloy.

10. A boltless pipe flange apparatus comprising:
    (a) a metal, lower flange having a wedge shaped groove around an opening in the flange, the opening adapted for receiving a pipe therein;
    (b) a fusible alloy deposited in the groove;
    (c) heating means attached to the lower flange for heating the fusible alloy;
    (d) temperature sensing means attached to the lower flange; and,
    (e) a metal upper flange having a wedge shaped tongue protruding therefrom for engaging with the groove of the lower flange, the tongue positioned around an opening in the upper flange, the upper flange opening adapted for receiving a pipe therein, whereby upon heating of the fusible alloy by the heating means the tongue engages with the groove, and whereby upon cooling of the fusible alloy the flanges solidly couple and seal.

11. The flange apparatus as recited in claim 10 wherein the tongue and groove are circular and concentric around the opening in each of the upper and lower flanges respectively.

12. The flange apparatus as recited in claim 10 wherein the fusible alloy includes elements selected from the group consisting of bismuth, lead, tin, cadmium, and antimony.

13. The flange apparatus as recited in claim 10 wherein the fusible alloy melts within the temperature range of 47° C. to 247° C.

14. The flange apparatus as recited in claim 10 further including an alloy reservoir in the lower flange, the alloy reservoir communicating with the groove for supplying the alloy and for allowing displacement of the alloy upon mating of the tongue and groove.

15. The flange apparatus as recited in claim 10 wherein the heating means is selected from the group consisting of an electrical wire heating element and a steam tube.

16. The flange apparatus as recited in claim 10 further including a gasket between the upper and lower flanges surrounding each opening in the upper and lower flanges.

17. The flange apparatus as recited in claim 10 wherein the lower flange further includes a meltable polymer for providing corrosion resistance to the fusible alloy.

* * * * *